United States Patent [19]

Schwartzman

[11] Patent Number: 5,140,873
[45] Date of Patent: Aug. 25, 1992

[54] WIRE STRIPPER

[75] Inventor: Simon Schwartzman, Westlake Village, Calif.

[73] Assignee: Wiretech Co., Westlake Village, Calif.

[21] Appl. No.: 724,739

[22] Filed: Jul. 2, 1991

[51] Int. Cl.⁵ .............................................. H02G 1/12
[52] U.S. Cl. ..................................... 81/9.43; 81/9.51
[58] Field of Search .................... 81/9.43, 9.41, 9.4, 81/9.51

[56] References Cited

U.S. PATENT DOCUMENTS

| | | | |
|---|---|---|---|
| 3,176,550 | 4/1965 | Marcotte | 81/9.51 |
| 3,222,957 | 12/1965 | Kramer et al. | 81/9.51 |
| 3,765,277 | 10/1973 | Sorensen | 81/9.43 |
| 4,072,069 | 2/1978 | Bieyanski | 81/9.43 |
| 4,803,903 | 2/1989 | Wolter et al. | 81/9.51 |
| 4,942,789 | 7/1990 | Hoffa | 81/9.51 |

FOREIGN PATENT DOCUMENTS 0187161 10/1956 Fed. Rep. of Germany ....... 81/9.51

Primary Examiner—Roscoe V. Parker
Attorney, Agent, or Firm—Bruce A. Jagger

[57] ABSTRACT

A portable, lightweight, handheld, battery powered wire stripper which has an automated adjustable stripping cycle. Various components are assembled into a lightweight frame so as to define a generally axially extending wire stripping channel for receiving a free end of an insulating wire from which a slug of insulation of an adjustable predetermined length is to be semi-stripped. Sensors and controls are provided so that the insertion of the free end of a wire into the channel triggers the commencement of an automatic stripping cycle. During the cycle the wire is clamped in position in the channel and two edged blades are snapped into the insulation by electrical solenoids to form a slug of insulation. The edged blades are left in the closed position and the slug is stripped by moving the closed blades axially towards the free end of the wire. An electrical motor driving a lead screw is used to generate the substantial force which is required to semi-strip the slug from the wire.

7 Claims, 4 Drawing Sheets

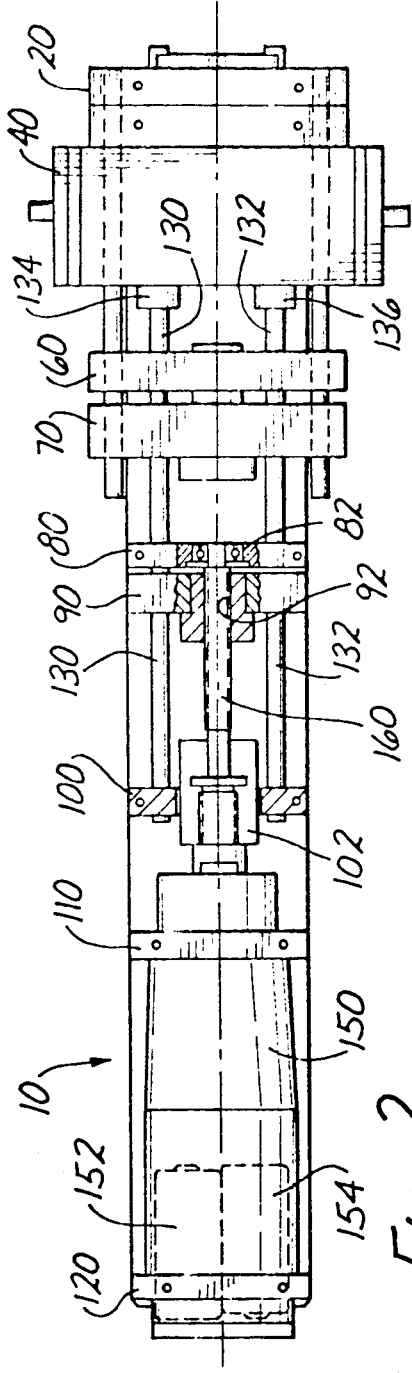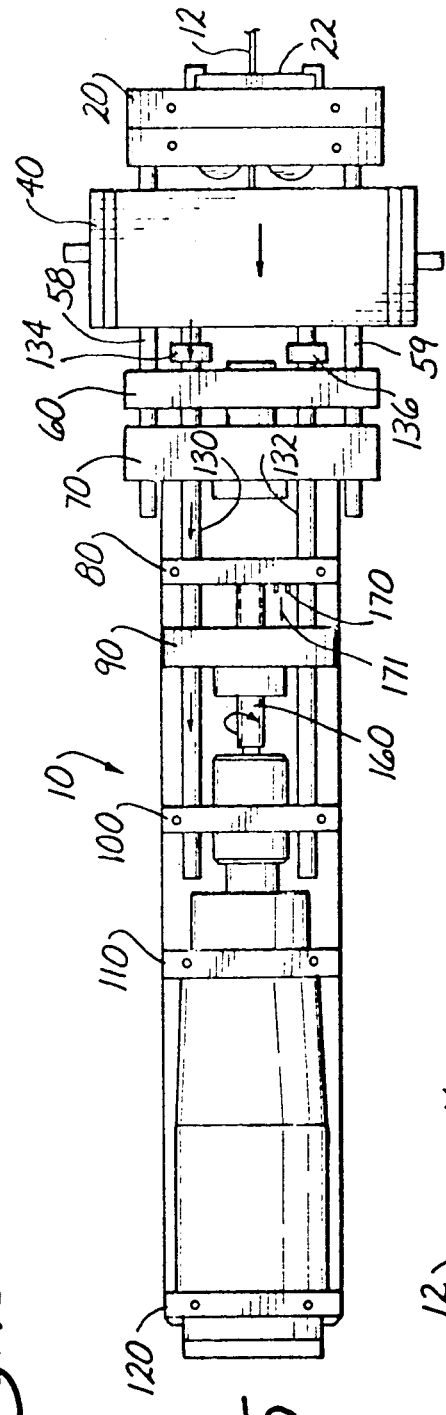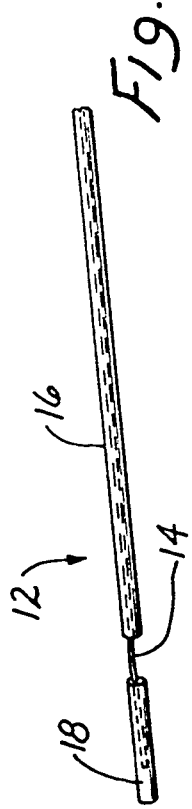

WIRE STRIPPER

BACKGROUND OF THE INVENTION

1. Field of the Invention

This invention relates generally to mechanical wire strippers and more particularly to automatic mechanical wire strippers which are self-contained and portable.

2. Description of the Prior Art

Wire strippers are devices used to strip a portion of insulation from one end of a conductive wire, thereby leaving an exposed conductive element ready to be connected as required. A variety of automatic devices have been employed to perform this function.

The mechanical method of wire stripping refers to any method where insulation cutting blades act on the insulation portion of the wire in a mechanical fashion.

Previous devices which employ this mechanical method include hand-held and manual-operated wire strippers, manual-operated bench strippers, automatic bench strippers, automatic rotary strippers, manual-operated rotary strippers.

Automatic strippers are favored because they provide power driven precise stripping, but they generally comprise heavy motors which are generally electrically or pneumatically powered air cylinders requiring cumbersome power cords and/or pneumatic lines which limit portability and movement.

Those devices which offer the convenience of portability, usually do not provide the accuracy or power actuation of automatic wire strippers.

Wire strippers are widely used in many industries including, for example, the aerospace manufacturing industry.

The electrical wire of an airplane generally involves the use of a wiring harness which may contain hundreds of individual wires and may weigh several hundred pounds. The wire harness is necessarily long, heavy, and cumbersome. Generally, on a first end of the harness, all of the wires are stripped and fitted with terminals for connection to respective first terminals in the aircraft. The wires in the first end of the harness are generally stripped with automatic bench mounted wire strippers. A wiring harness is generally assembled from the separate wires on a harness board. The second ends of the wires are stripped, crimped and terminated after the harness is assembled on the harness board. The second end is generally cut and stripped by manual hand held stripped because it is not possible to bring the heavy automatic equipment to where the second end is located in the harness.

Each stripped end of wire must meet certain industry specifications. First, standard die blades should be used so the electrically conductive elements are not damaged. Second, each end should be "semi-stripped" or "stripped".

A wire is fully stripped when a portion of insulation, referred to as a slug, has been completely separated from the rest of the wire leaving an exposed conductive portion equal in length to the removed slug. A wire is "semi-stripped" when the slug is separated from the rest of the insulating material, but not completely removed from the conductive portion of the wire. By remaining on the end of the conductive portion, the slug performs the function of protecting the stripper conductive portion from becoming frayed. As used herein the terms "strip", "stripped" and "stripping" shall means and include both full and semi-stripping unless otherwise indicated.

Precision and accurate repeatability are desired of any stripper. Strip length repeatability is very important. A specific strip length is required for each particular contact type. The strip length must be precise but easily adjustable. To this end, automation is preferred over manual operation. To the extent that any operator controlled action can be replaced by automatically controlled action, repeatability and precision will be improved.

Reliability and convenience are also improved with the use of automation.

A preferred stripper will also allow several functions to be adjustable. For instance, a stripper should be able to receive and strip wires of different gauges. A stripper should further allow for the adjustment of the length of insulation to be stripped and the positioning of the semi-stripped slug.

The ease and rapidity with which the wire stripper performs its function is also of utmost importance.

In the aerospace industry, the first end of the harness is stripped and terminals applied on a work bench. These wires are usually mechanically stripped on a bench with a large automatic fixed-in-place wire stripper having at least most of the aforementioned features including, precision, accurate repeatability, reliability, convenience, adjustability, compliance with industry standards and specifications, and preferably automatic.

The second end of the harness contains wires that are preferably not stripped until after they are cut to the required length on the harness board. These wires are best stripped at the location where the second end is to be fitted with a terminal and connected to a mating terminal on a device or bus. This requires the use of a wire stripper which allows an operator to maneuver in a variety of positions and different locations. A heavy stationary mounted stripper cannot be used. Manually operated strippers are not accurate and are fatiguing and potentially injurious to use. A wire stripper which is most suitable for working on the second end of a harness should be, inter alia, small, automatic, lightweight, portable, and should not require the use of lengthy and cumbersome power cords or air lines.

BRIEF SUMMARY OF THE INVENTION

This invention provides a portable automatic wire stripper which performs the function of precision semi-stripping or fully stripping an insulated wire. The precision stripper according to the present invention is battery powered, lightweight, self-contained, and therefore portable. The difficulties with prior expedients which used pneumatic power and large electric solenoids which were heavy, cumbersome and required external power connections are thus avoided. The various elements which are required to perform the functions of wire stripping in devices of the present invention are optimized as to weight, capacity, simplicity, power consumption, maintainability, accuracy, automation and otherwise so as to provide a precision tool which is lightweight, portable and easy to operate and maintain.

In order to provide the necessary precision and repeatability according to the present invention, the wire stripping cycle is preferably automated and the cycle is wire-actuated, and not operator-actuated. Preferably, a sensor detects when the wire is at the right place within the device's stripping channel to initiate a stripping cycle. The strip length is preferably precisely adjustable by operation of a vernier on the outside of the device or by other convenient electric or electronic means. The strip length may, for example, be adjusted automatically when a particular type of connector is identified by the operator. This allows the strip length to be precisely preset so that the same result is achieved with each cycle.

According to this invention, the process of stripping or semi-stripping a wire preferably involves four steps. The preferred, but not the only, sequence of operations involves insulation perforation, clamping, slug separation and release. First, the insulation is perforated or nicked at a precise selected location. Second, and generally concurrently, the wire is fixed in a stationary position relative to that selected location. Third, the slug portion of the insulation (between the perforation and the free end of the wire) is pushed or drawn along the wire and separated from the remaining insulation. Finally, the wire is released from its stationary position and withdrawn from the stripping channel as the device is reset. Each of these steps is performed with components designed to be as lightweight, reliable, precise and compact as possible. Stripping devices according to this invention are preferably battery-powered and, therefore, can be self-contained and portable. Various mechanical, electronic and electrical elements are employed in a preferred combination so as to achieve the objectives of the present invention. Various equivalent elements other than those described herein may be employed if desired.

The first step of perforating the insulation is preferably performed by a selected pair of edged blades which are guided toward each other in a first plane, although other perforation means such as, for example, laser cutters, may be employed. Die-type blades form a cutting hole sized to avoid cutting the conductive wire. When blades are employed, the wire is positioned in a guide hole whose axis is generally perpendicular to the first plane and intersects the plane at the point where the blades separate the insulation and the cutting hole is formed. When the blades have fully advanced, the insulation is perforated and the blades are preferably in a position to be used in the third step of separating the slug from the rest of the insulation. The use of blades as the perforating means permits them to also be used in the slug separation step which avoids the necessity for the provision of an additional slug separation means. This first step is preferably powered by relatively small and light electrical solenoids which are connected to the blade holders. The solenoids are mechanically independent of each other and require no mechanical linkage to other elements in the device, thus minimizing complexity and weight. Also, the solenoids drive the blades very rapidly into the insulation, thus contributing to the penetration of the insulation. Relatively light weight mechanical elements are required to cause perforation of the insulation when the blades are snapped or driven into the insulation at high speed, so small solenoids are suitable for this purpose. Mechanical drivers such as cams or the like do not snap the blades into contact with the insulation so a heavier mechanism is required to generate the force which is needed to nick the insulation. Not only do such mechanical devices increase the weight, complexity and expense of the device, but they increase the risk of damaging the conductor portion of the wire.

The second step, which generally occurs simultaneously with or slightly after the first step, preferably involves mechanically releasing two opposed spring-biased clamps so that their spring-bias drives them into engagement with the wire where they then grip and immobilize the non-slug portion of the insulated wire. These clamps are conveniently released by the movement of a cam or cams in response to translational movement of contact members. The springs are generally lighter in weight, simpler and easier to maintain than motor driven clamps of equivalent capacity. The clamps are positioned so that the force applied to pull the slug of insulation axially along the wire towards the free end of the wire causes the clamps to grip the wire more tightly. Weight and complexity are thus minimized.

The third step of separating the slug from the rest of the insulation and sliding it axially along the wire towards the free end of the wire, according to one embodiment, involves the axial movement of at least the blades and preferably the entire block of elements, including the solenoids, blade holders and closed blades, along the wire away from the still closed clamps. The clamps remain stationary relative to the wire. This movement of the closed blades necessarily pushes the slug along with the rest of the block of elements. This translational movement of the block is preferably accomplished through contact with the same contact members that release the clamps so that only one drive means is needed. Considerable force is required to carry out this translational movement. The elements which are employed to exert this force must be carefully selected so as to minimize weight, complexity, cost and maintenance. Also, the force must generally be greatest when the separation step is initiated and the slug is separated from the rest of the insulation.

The final releasing step includes retracting the blades, returning the solenoid block, to its initial position and rotating the clamps out of engagement with the wire. The clamps are preferably forced out of engagement with the wire through contact with the same contact members travelling in a second opposite direction. The solenoid block is also returned to its initial position through the action of contact members also travelling in the second direction.

Although it is generally left on the end of the wire to protect it, the slug may be removed entirely from the wire as a part of or immediately following the release step. Preferably, if the slug is to be removed from the wire at this point, removal is accomplished using some mechanical element mounted on the stripper outside of the stripping channel. A plate with a "V" shaped notch mounted near the front of the stripper where it is convenient to drag the wire through the notch as the wire is removed from the stripper channel is suitable for the purpose. The slug should be removed at a location where it will not fall into the stripping channel and jam the device.

Movement of all contact members is accomplished through the use of a drive mechanism such as a programmable linear actuator or a rotating lead screw driven by a relatively small and lightweight D.C. motor. The drive mechanism is preferably battery-powered. Considerable force is required to accomplish the necessary steps in the stripping cycle. Many known drive mechanisms are not capable of generating the necessary force, particularly from a dead stop, unless they are relatively heavy. Linear actuators and D.C.

motor driven rotating screws are both lightweight and capable of generating the necessary force at each step of the cycle where such force is required. The use of the same linear actuator or motor driven screw to accomplish with multiple functions of releasing the clamps into engagement with the wire, moving the solenoid block along with the slug away from the remaining insulation, returning the solenoid block to its initial position, and forcing the clamps out of engagement with the wire considerably reduces the weight of the device.

Existing programmable linear actuators weighing only approximately 70 grams are capable of providing a linear force of as much as 40 pounds through a stroke of approximately 0.5 to 1.25 inches. The position of the actuator along its stroke path can be very closely controlled, programmed and monitored by a microprocessor, thus permitting the elimination of some position sensors. In general, linear actuators are D. C. stepper motors with internal built in lag screws arranged so that the output is in the form of axial motion by a non-rotating shaft. The amount of the axial movement is precisely programmable.

The motor or linear actuator and the solenoids in one embodiment are both electronically connected to an actuating sensor which sends an electronic signal to both the motor and the solenoids when a wire is inserted to a predetermined position within the device. This is accomplished through the use of a microprocessor, relay logic or other control means. This signal activates the solenoids which, in turn, closes the blades to perforate the insulation. The signal from the actuating sensor also activates the motor to rotate the lead screw in a clockwise direction which, in turn, moves the contact members in the first direction to release the clamps into engagement with the wire and move the solenoid block and slug away from the remaining insulation.

The motor and the solenoids in one embodiment are also both electronically connected to a cycle-ending sensor which sends an electronic signal to both the motor and the solenoids when the slug reaches a predetermined position along the wire. This cycle-ending signal activates the solenoids which, in turn, opens the blades from contact with the insulation. The cycle-ending signal also activates the motor to rotate the lead screw in a counter-clockwise direction which, in turn, moves the contact members in the second opposite direction which forces rotation of the clamps out of engagement with the wire and moves the solenoid block back to its initial position.

Once the wire triggers the initial sensor to start the cycle, the operation proceeds automatically until the wire is released with the semi-stripped slug covering its end. The operator does not have the opportunity to influence the result of the operation while the cycle is taking place.

Preferably, a resetting sensor, or combination of sensors, in electronic communication with the actuating and cycle-ending sensor automatically creates an electronic signal which automatically resets the actuating and cycle-ending sensors when the wire is removed from the device.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

BRIEF DESCRIPTION OF THE DRAWINGS

FIG. 2 is a partial cross-sectional top plan view taken along line 2—2 of FIG. 1.

FIG. 5 is a top plan view similar to FIG. 2 showing the invention near the end of its automatic stripping cycle.

FIG. 7 is a view of a semi-stripped wire.

DETAILED DESCRIPTION OF PREFERRED EMBODIMENT

Figure 1:
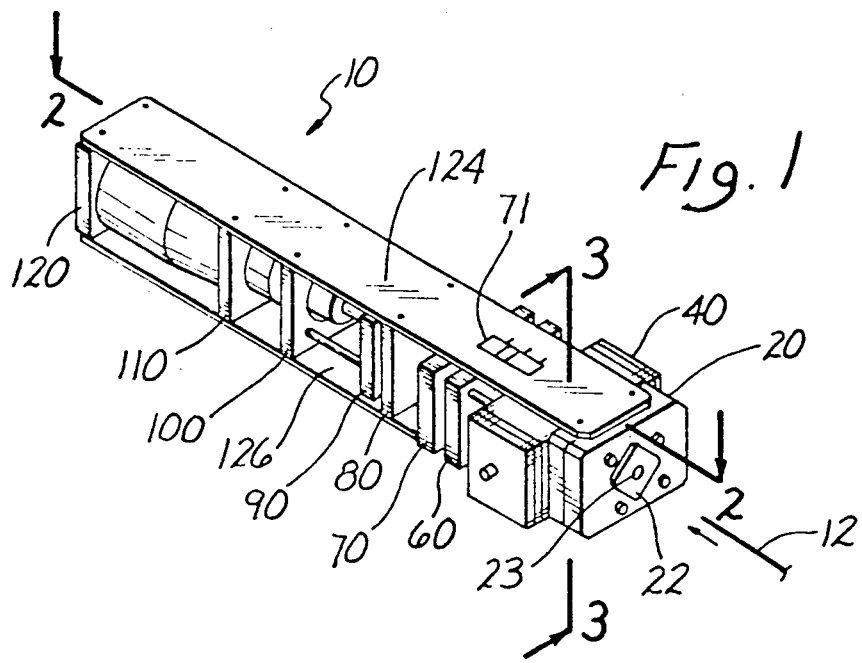
FIG. 1 is a perspective view of one preferred embodiment of this invention.
Figure 3:
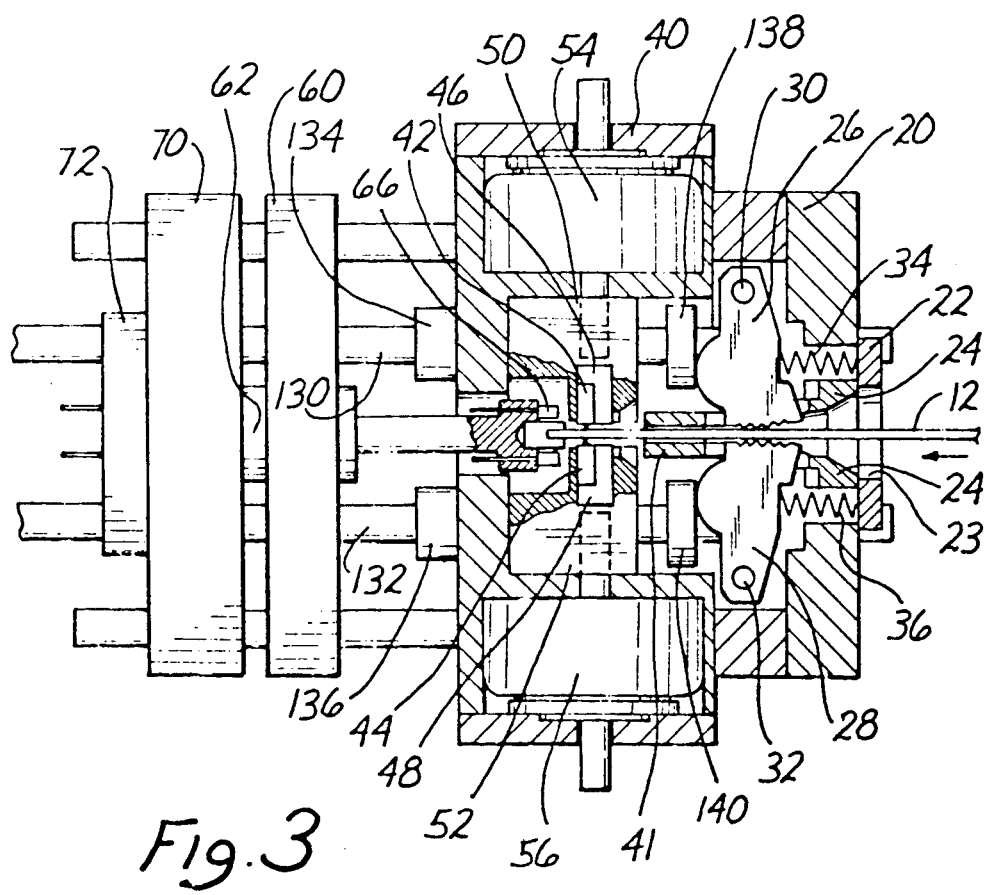
FIG. 3 is a partial cross sectional view taken along line 3—3 of FIG. 1 showing a wire being inserted to initiate a stripping cycle.
Figure 4:
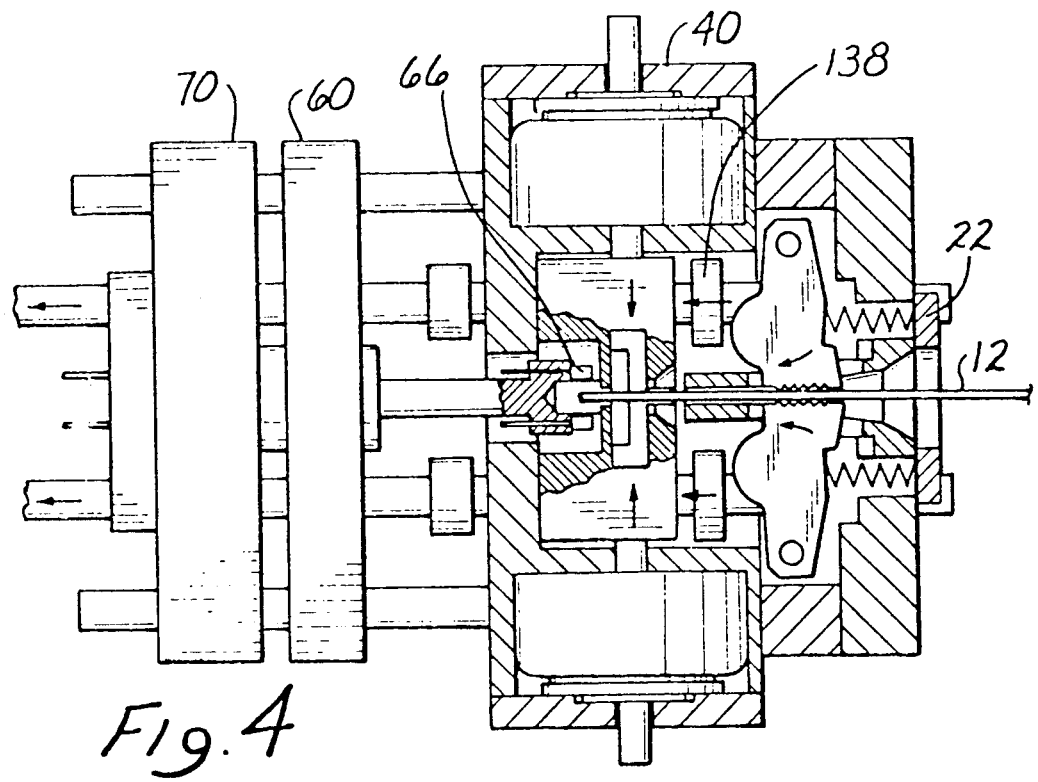
FIG. 4 is the same partial cross section view similar to FIG. 3 showing the insulation on a wire in the process of being perforated.
Figure 6:
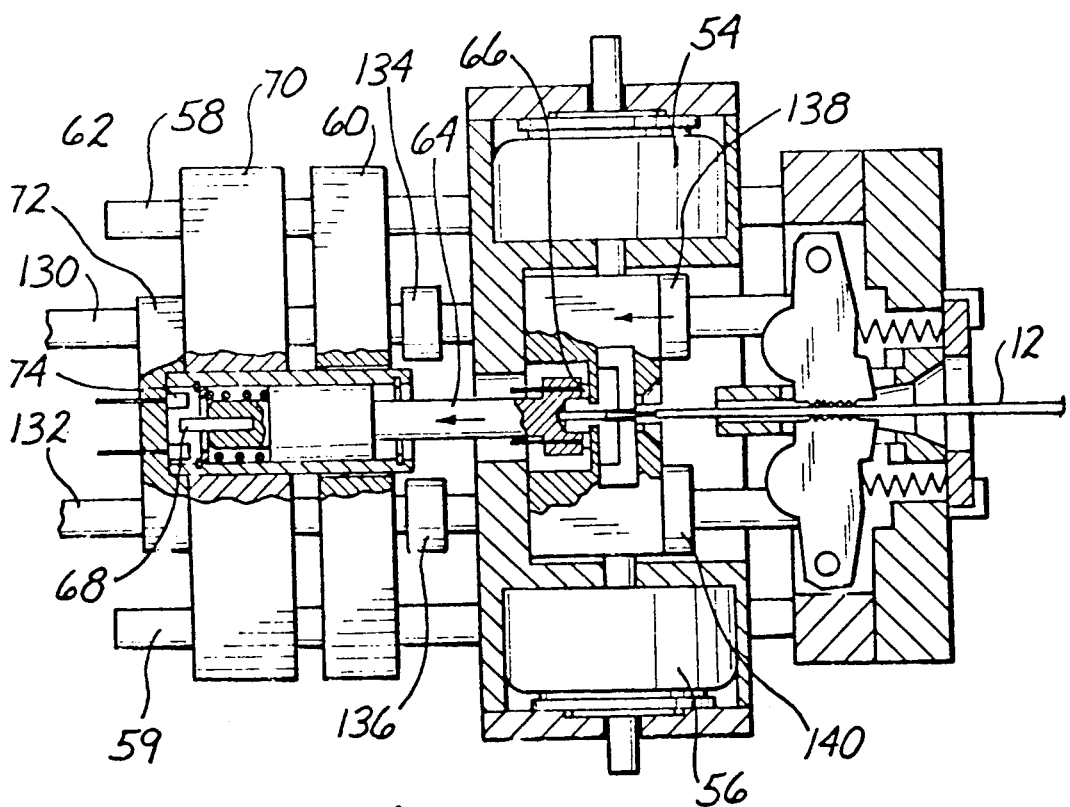
FIG. 6 is partial cross-sectional view similar to FIG. 3 including a further cross-sectional view of a second portion of this embodiment showing the device near the end of its stripping cycle.

The wire stripper 10 of this invention is adapted to automatically semi-strip an insulated wire 12. A semi-stripped wire is shown in FIG. 7 having a slug portion 18 of insulating material separated from the rest of the insulating material 16, but not completely removed from the conductive portion 14 of wire 12. The slug serves to protect the free end of the wire from damage until a suitable connector can be mounted thereon.

A preferred embodiment of this invention is shown in FIGS. 1-6. Wire stripper 10 comprises an insertion block 20, a perforating block 40, a support block 60, a sensor holding block 70, shaft support blocks 80 and 100, a puller block 90, and motor support blocks 110, 120.

Insertion block 20, support block 60, shaft support blocks 80 and 100, and motor support blocks 110, 120 are all securely fixed with respect to top plate 124 and bottom plate 126. These several blocks are arranged along the longitudinal axis of the wire stripper 10, and in the aggregate serve to provide a solid frame for mounting and maintaining the functional elements of the wire stripper along a predefined longitudinal axis. Sensor holding block 70 is mounted for axial adjustment along this longitudinal axis so as to facilitate various strip lengths.

Puller block 90 is securely fixed to puller shafts 130, 132. A first set of contact members 138, and 140, and a second set of contact members 134, 136, are preferably present in the form of collars which are mounted on and movable with puller shafts 130 and 132. These sets of contact members or engaging elements are mounted on either side of perforating block 40 so as to engage with and drive this block in first one and then the other axial direction. The engaging elements are spaced along the puller shafts so that there is some axial movement of the puller shafts at both ends of the shafts' axial travel before the perforating block moves. This spacing or axial play, among other things, allows the clamps 26 and 28 to engage the wire before the perforating block commences its axial movement towards the free end of the wire. Puller shafts 130, 132 are supported by, and translationally or axially movable within, sets of axially aligned apertures within shaft support or alignment blocks 80 and 100 and insertion block 20.

The puller shafts function in general as a means for mechanically transmitting the necessary force from the driver to the moving elements which accomplish the stripping operation. Contact members 138 and 140 serve to act on or control clamps 26 and 28 to disengage them from or hold them out of engagement with the wire in the stripping channel, and to carry the perforating block 40 axially toward the free end of the wire so as to semi-strip the slug of insulation from the wire.

Perforating block 40 is slidably mounted on fixed shafts 58, 59, which are fixed with respect to top plate 124 and bottom plate 126 and aligned on axes which are parallel to the axis of puller shafts 130, 132.

Insertion block 20 includes cover plate 22 which has a center hole 23 for receiving an insulated wire therethrough. Center hole 23 is axially aligned with the aperture 25 within wire guide 24 which is adapted to guide a wire inserted therethrough along a defined straight path or striping channel. The stripping channel is generally coextensive with the longitudinal axis of the wire stripper. Clamps 26 and 28 extend through ports in wire guide 24. Clamps 26, 28 are rotatably or pivotally mounted inside insertion block 20 by pivot pins or mounting means 30, 32. Clamps 26, 28 are spring biased, by springs 34, 36, to rotate toward a gripping position in which the wire gripping teeth of clamps 26, 28 are adapted to engage a wire therebetween. The cam portions of clamps 26 and 28 are positioned so as to engage contact members 138 and 140. Wire guide 24 includes a wire guide portion 41 which serves to guide the wire into the perforating block 40.

Perforating block 40 includes insulation nicking or perforating edged blades 42, 44 which are releasably mounted within bladeholders 46, 48. Blades 42, 44 are directed towards the aforementioned defined straight path and are adapted to perforate or nick the insulation of a selected gauge of wire when the wire is placed therebetween and the blades 42, 44 are snapped into contact with the insulation. Sharp edges on blades 42 and 44 aid in penetrating the insulation when the blades are snapped into contact with it. Bladeholders 46, 48 are slidably mounted, within bladeholder brackets 50, 52, for movement along an axis which intersects the aforementioned defined straight path. Bladeholders 46, 48 move slidably between a first perforating position in which blades 42, 44 are in position to nick or perforate the insulation on an insulated wire, and a retracted or non-perforating position in which blades 42, 44 are out of contact with the wire. Bladeholders 46, 48 are slidably driven by electrically actuated solenoids 54, 56. The solenoids operate simultaneously but are mechanically independent of each other. They are coordinated in their operation, along with the rest of the automated stripping cycle, by a suitable control member which will be more fully described hereinafter. The solenoids instantaneously accelerate the edged blades 42 and 44 to a very high speed and snap them into the insulation. The blades are snapped into, as distinct from being relatively slowly pushed into, the insulation. Excellent penetration is thus achieved with a relatively lightweight mechanism.

Support block 60 assists in supporting fixed shafts 58 and 59. Actuator sensor holder 64 is slidably mounted within sleeve 62. Actuator sensor 66 is fixed to a first end of actuator sensor holder 64. Pin 68 is fixed to a second end of actuator sensor holder 64.

Sensor holder block 70 also assists in the support of sleeve 62. Sensor holding block 70 includes cycle-ending sensor holder 72 to which cycle-ending sensor 74 is fixed.

First shaft support block 80 includes a support bracket 82 for retaining and rotatably supporting one non-threaded end of a rotatable lead screw 160 having a function which will be discussed below.

Puller block 90 serves to mount an internally threaded nut which is provided with an axially threaded bore 92 therethrough which bore is axially aligned with the aforementioned defined straight path. The threaded bore 92 is adapted to receive therewithin the mating threads of rotatable lead screw 160, whereby rotation of lead screw 160 in a clockwise direction moves puller block 90 away from first shaft support block 80, see for example, FIG. 5, and rotation of lead screw 160 in a counterclockwise direction moves puller block 90 towards first shaft support block 80.

Second shaft support block 100 is axially ported to permit the free rotation of shaft coupling member 102. Coupling member 102 couples the other end of rotatable lead screw 160 to electric motor 150. Electric motor 150 is preferably powered by one or more batteries 152, 154. Electric motor 150 is fixed to motor support blocks 110, 120 in axial alignment with the aforementioned defined straight path.

The desired slug length and gap between the slug and the remaining insulation is set by adjusting sensor holding block 70 using, for example, strip length selector 71. The clamps 26, 28 are preferably adjustable to handle at least wire gauge sizes 14 to 26. Depending on the size of the insulated wire 12, appropriately sized blades 42, 44 are mounted in bladeholders 46, 48. The blades are selected so that they nick the insulation on wire 12 in the closed position but do not touch the conductive elements inside of the insulation. When the proper blades are in place and the gap size has been set the wire stripper 10 is ready to automatically semi-trip an insulated wire 12 that is manually inserted into center hole 23.

Wire 12 is manually guided along the stripping channel through the hole or port 23 in cover plate 232, between clamps 26, 28, and through guide portion 41. In this manner, wire 12 is passed through insertion block 20 and perforating block 40. Wire 12 eventually passes adjacent actuator sensor 66 which starts the automatic cycle within wire stripper 10.

Actuator sensor 66 is preferably a photosensor. It is in electronic contact with solenoids 54, 56 and electric motor 150. Upon sensing the presence of insulated wire 12, actuator sensor 66 sends an electronic signal which activates solenoids 54, 56 and electric motor 150.

Activation of solenoids 54, 56 moves blade holders 46, 48, and, necessarily, blades 42, 44 into their perforating position. Blades 42, 44 close fully until they contact each other and this action produces a nick in the insulation of wire 12. Blades 42, 44 remain closed to perform the function of pulling the slug portion 18 away from the remaining portion of insulation 16, as is more fully described hereinbelow.

At about the same time as the insulation of wire 12 is being nicked by blades 42, 44, electric D.C. motor 150 is activated resulting in clockwise rotation of lead screw 160 which starts pulling puller block 90 towards electric motor 150. First set of contact members 138, 140 is thereby moved away from clamps 26, 28 allowing springs 34, 36 to force clamps 26, 28 into their gripping position whereby the teeth of clamps 26, 28 bite down on the remaining portion of insulation 16 preventing further movement of the remaining portion of insulation 16 during the rest of the automatic operation of wire stripper 12.

First set of contact members 138, 140 continues to move until coming into contact with perforating block 40. Continued movement of contact members 138, 140 moves perforating block 40 axially away from stationary clamps 26, 28. Blades 42, 44 remain in the closed position as block 40 moves away from clamps 26, 28 thereby stripping slug 18 from remaining insulation 16. Slug 18 pushes actuator sensor holder 64, which is spring loaded and rides inside the sleeve 62, until pin 68 passes adjacent cycle-ending sensor 74. Pin 68 is used so that cycle-ending sensor 74, preferably a photosensor, can be placed out of the stripping channel in a convenient place. Cycle-ending sensor 74 is in electronic contact with solenoids 54, 56 and electric motor 150. When Pin 68 eventually activates photosensor 74, a signal is sent to both solenoids 54, 56 and electric motor 150. Upon receipt of this signal, blades 42, 44 are moved to their non-perforating position and electric motor 150 is stopped. Limit switches or other sensors (not shown) are engaged, which signal, for example, a microcontroller (not shown) which in turn actuates the motor 150 to rotate in the opposite direction. The lead screw 160 is rotated in a counterclockwise direction driving contact members 134, 136, 138, and 140 to move axially in the opposite direction. First set of contact members 138, 140 are driven into Clamps 26, 28 forcing rotation of the clamps 26, 28 into their non-gripping position whereby the insulated wire 12 is released from the grip of the teeth on clamps 26, 28 as the clamps 26, 28 are forced against springs 34, 36.

At the same time, block 40, carrying the solenoids, is pushed back to its original home position by second set of contact members 134, 136. Home sensor 170 is mounted on first shaft support block 80. Home sensor 180 checks for the presence of flag 171 which is mounted on puller block 90. When sensor 170 detects the presence of flag 171 the microcontroller knows that the device is in the home position. The operator can now withdraw the processed wire out of the wire stripper 10. The stripper always starts its cycle from home position. If for some reason the device is not in the home position when it is powered up the first thin it tries to do after power up is to move to the home position.

Preferably, there are sensor means provided to automatically reset actuator sensor 66 and cycle-ending sensor 74 in order to start a new cycle. In one embodiment the removal of the slug past actuator sensor 66 accomplishes this resetting function. Alternatively, the resetting function may be performed manually. In an embodiment not shown, a third photosensor is activated when the processed wire is withdrawn from the wire stripper 10. The third photosensor is preferably located somewhere near wire guide 24 and its function is to communicate to the other photosensors 66, 74 that a cycle has ended and to prepare for a new cycle.

Figure 8:
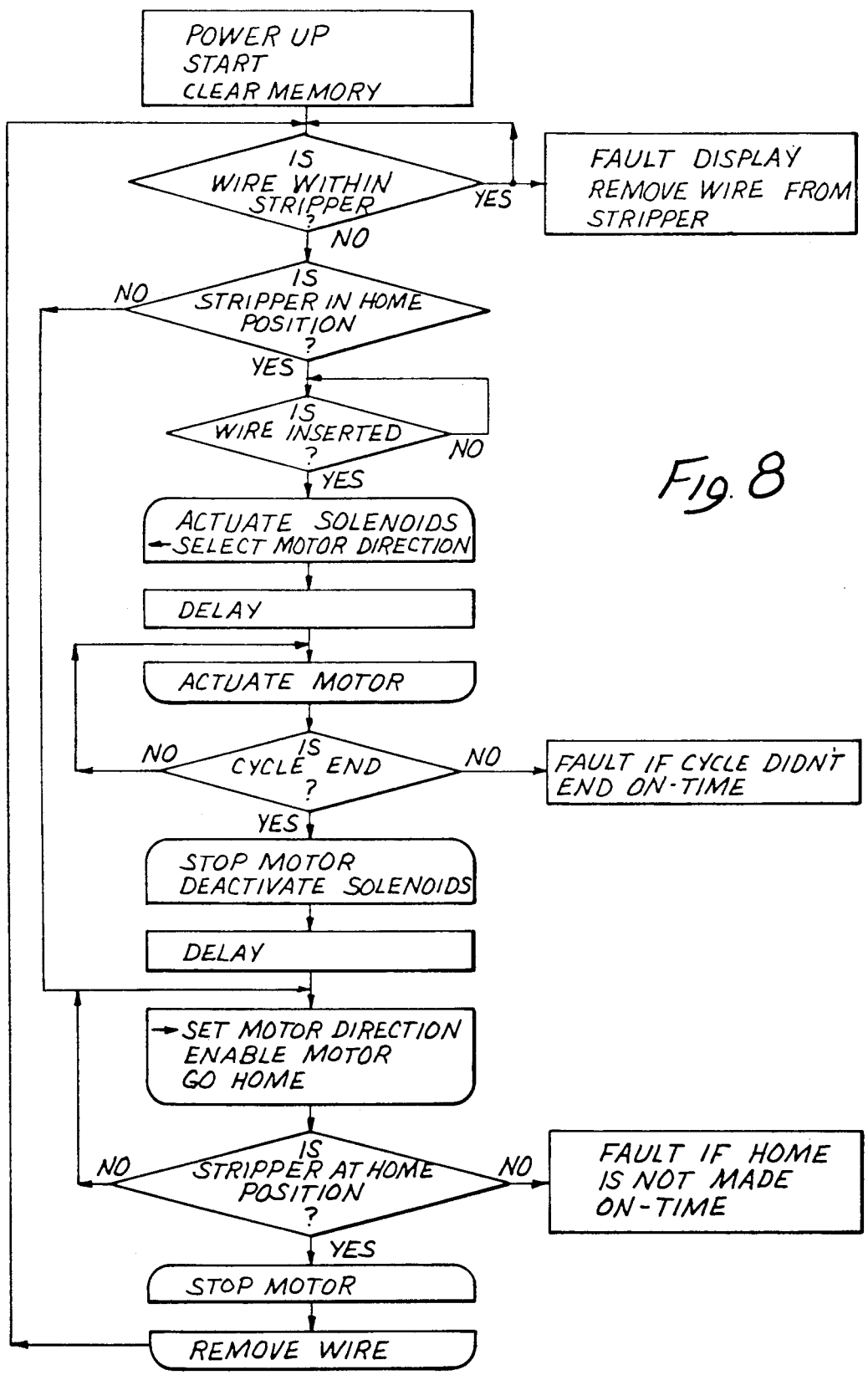
FIG. 8 is a flow chart of one embodiment of the operation of the invention.

The entire cycle is preferably driven by a microprocessor and can incorporate one or more photosensors in combination to perform the reset and other functions. A flowchart of a typical cycle is illustrated in FIG. 8.

Various microcontrollers are commercially available to act as the central processor unit for the system. Preferably the central processor is programmable, includes built in random access memory, operates at high speed, provides the capacity for input and output, supports a liquid crystal display, and is widely available. One such central processor is the Intel brand 80C51/80C31 chip. Various information can be displayed on a liquid crystal display including, for example, malfunction information such as low battery warning, failure to reset, unable to initiate cycle and wrong blade selection, maintenance information such as error log, time for routine maintenance and time to replace blades, and management information such as number of strips per hour, cumulative number of strip cycles and number of strips per wire size. Other information can be provided as needed. The central processor is preferably incorporated into an integrated circuit with other circuit elements by surface mount technology so as to reduce weight.

A digital or dial display is preferably provided to allow the microprocessor to output messages to the user concerning the presence or absence of a wire, the appropriate blade size to be used, where the device is in its cycle, the malfunctioning of the apparatus, or any other desired information. The use of a microprocessor also allows an operator to program in the desired strip length, wire diameter and any other additional information.

An input element is preferably provided to allow the user to easily set the desired strip length and wire size by inputting the required information to the microprocessor.

The invention is not limited to the embodiments described above, but all changes and modifications thereof, not constituting departures from the scope and spirit of the invention, are intended to be included.

What is claimed is:

1. A lightweight handheld portable wire stripper having an automated adjustable stripping cycle comprising:
   means defining a generally axially extending wire stripping channel for receiving a free end of an insulated wire from which a slug of insulation of an adjustable predetermined length is to be stripped;
   means for perforating said insulation while said insulated wire is in said wire stripping channel to form said slug of insulation, said means for perforating including at least two blades driven independently of one another into said insulation by electrically actuated solenoids;
   means for releasably clamping said wire adjacent to said slug to hold said wire in a predetermined position within said wire stripping channel;
   means for stripping said slug from said wire while said means for releasably clamping is holding said wire in said predetermined position, said means for stripping including an electrical motor and lead screw mechanically coupled to said means for perforating and adapted to move said means for perforating toward said free end while said blades are in said insulation to separate said slug from said insulation by a predetermined distance;
   at least one sensor element operably positioned adjacent to said wire stripping channel and being capable of sensing the presence of an object at a predetermined location within said stripping channel and generating a signal responsive to such sensed presence; and control means for controlling and coordinating the operation of the said respective means responsive to at least a signal received from said sensor element.

2. A wire stripper of claim 1 wherein said means for perforating comprise:

two blades positioned on opposing sides of and directed towards said wire stripping channel, said electrically actuated solenoids being adapted to snap said blades between a retracted non-perforating position in which there is no contact between said blades and said insulation and an extended perforating position in which said blades are configured to perforate the insulation.

3. A wire stripper of claim 1 wherein said means for releasably clamping comprise at least two clamps positioned on opposing sides of said wire stripping channel, said clamps being spring biased toward a gripping position in which said clamps tightly grip said wire, said means for stripping including a mechanical element adapted to move said clamps against said spring bias to release said wire.

4. A wire stripper of claim 1 wherein said wire stripper is battery powered.

5. A wire stripper of claim 1 wherein said wire stripper includes a sensor element which is adapted to sense the presence of a free end of a wire at a predetermined location in said stripper channel when said wire is inserted into said stripper channel by an operator, and to send a first signal to said control means, said control means being adapted to control said wire stripper so as to initiate the stripping of said wire responsive to said first signal and to complete the stripping and release said wire without any input from said operator.

6. A wire stripper of claim 1 including means for permitting an operator to adjust the adjustable predetermined length of said slug.

7. A lightweight, handheld, battery powered wire stripper having an automated adjustable stripping cycle comprising:

means defining a generally axially extending wire stripping channel for receiving a free end of an insulated wire from which a slug of insulation of an adjustable predetermined length is to bet stripped;

means for perforating said insulation while said insulated wire is in said wire stripping channel to form said slug of insulation, said means for perforating including means for simultaneously snapping at least two edged blades into said insulation;

means for releasably clamping said wire adjacent to said slug to hold said wire in a predetermined position within said wire stripping channel;

means for stripping said slug from said wire while said means for releasably clamping is holding said wire in said predetermined position, said means for stripping including means for moving said means for perforating toward said free end while said blades are in said insulation to separate said slug from said insulation by a predetermined distance;

at least one sensor element operably positioned adjacent to said wire stripping channel and being capable of sensing the presence of an object at a first predetermined location within said stripping channel and generating a first signal responsive to such sensed presence; and control means for initiating the stripping of said wire responsive to said first signal, and controlling and coordinating the operation of the said respective means throughout said stripping cycle without accepting any input from an operator during said stripping cycle.

* * * * *